Figure 1:
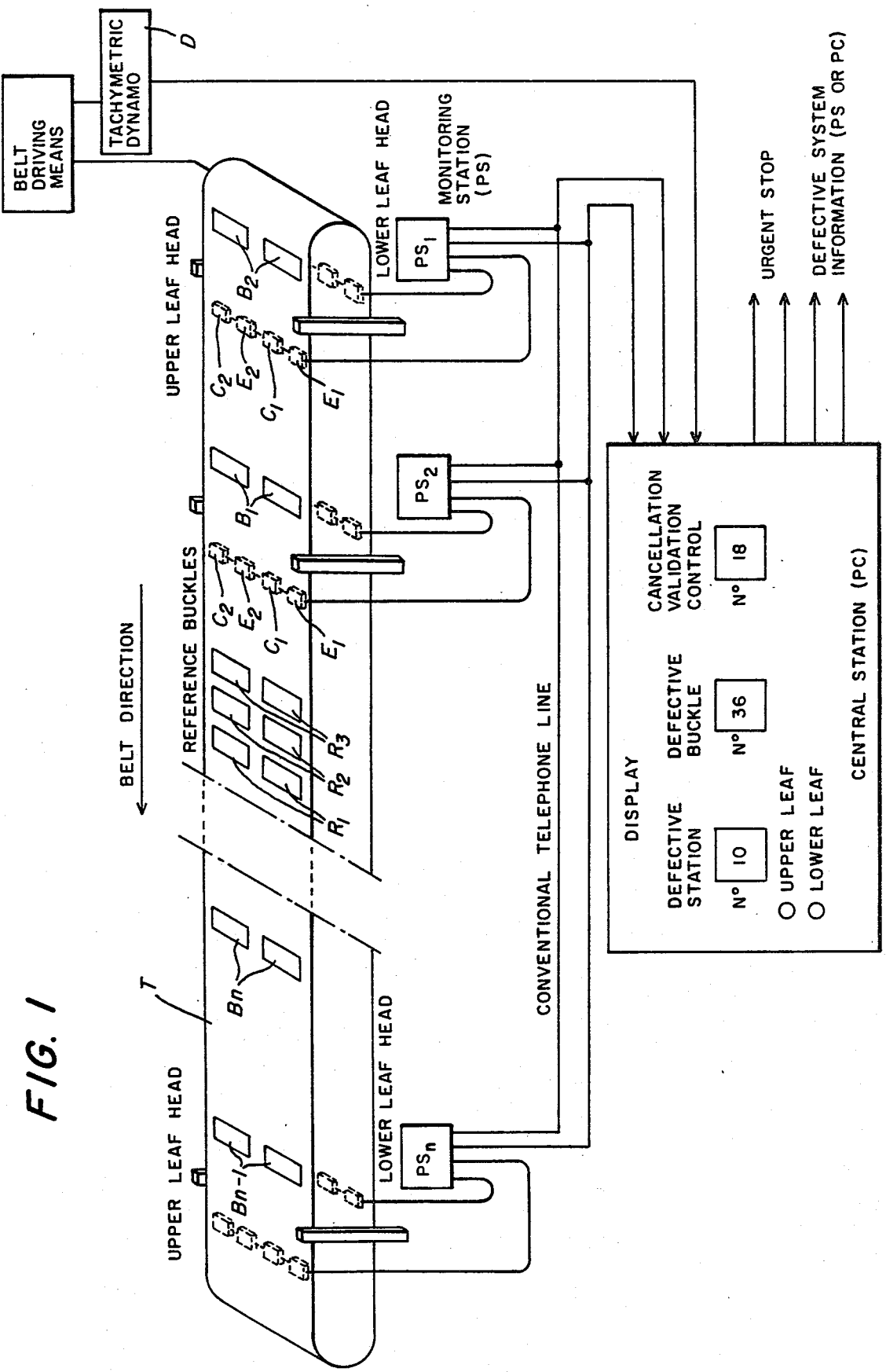

United States Patent [19]

Oriol

[11] 4,437,563
[45] Mar. 20, 1984

[54] INSTALLATION FOR MONITORING AN ENDLESS CLOTH CONVEYOR BELT

[76] Inventor: Marcel Oriol, 85 Bd Jean Jaurès, 92100 Boulogne, France

[21] Appl. No.: 288,328

[22] Filed: Jul. 30, 1981

[30] Foreign Application Priority Data

Jul. 30, 1980 [FR] France ................................ 80 16836

[51] Int. Cl.³ .......................................... B65G 15/00
[52] U.S. Cl. .................................... 198/810; 198/856
[58] Field of Search ......................... 198/502, 856, 810

[56] References Cited

U.S. PATENT DOCUMENTS 3,922,661 11/1975 Enabit et al. .................. 198/502 X
4,349,883 9/1982 Doljack ......................... 198/502 X Primary Examiner—Joseph E. Valenza
Assistant Examiner—Dennis J. Williamson
Attorney, Agent, or Firm—Fleit, Jacobson, Cohn & Price

[57] ABSTRACT

An installation for monitoring the state of an endless conveyor belt, where the condition of imbedded sensor conductors in the belt provides a warning indication and/or shutdown of the conveyor when damage occurs to the imbedded conductors. The installation consists of a control unit for receiving the signals, a programmed counter, a belt stop control, display, and manual controls.

5 Claims, 2 Drawing Figures

INSTALLATION FOR MONITORING AN ENDLESS CLOTH CONVEYOR BELT

The invention is concerned with an installation for monitoring an endless cloth conveyor belt.

Endless cloth conveyor belts of great length (several tens of kilometers) are already known; they take care of the transport of a mineral, e.g., from the mine to a shipping port. For that reason, it is very important at all times to monitor the state of the endless belt, so as to detect any lengthwise tear and to stop the conveyor in order to undertake the repair of the cloth before the tear will extend over its entire length. To that end, one has already undertaken to distribute, along the belt and on its inside, pairs of closed conductive buckles, with the buckles of each pair placed cross-wise in relation to the belt, in such a way that those buckles can be detected by pairs of pick-up devices which are distributed along the conveyor. Accordingly, when the passage of the two buckles is detected at any point of the conveyor, that means that, at that point, the belt does not present any tear, inasmuch as such a tear would have cut, at least, one of the buckles.

On the other hand, when only one of the pick-up devices detects the presence of one buckle, one concluded that the other buckle was cut, and that the cloth presented a tear at that spot. The conveyor was then stopped immediately, and the workers had to move toward that point of the conveyor belt, in order to undertake the repair of the cloth.

That system finds, therefore, its expression in lost time and considerably reduced profit-earning capacity at unforeseen times. Those known installations also comprise means that make it possible to detect a cutting of the two buckles of one and the same pair of the endless belt. As a matter of fact, in this case, when the two buckles are cut, no signal is produced, and one cannot detect that double tear of the belt.

In order to avoid that disadvantage, one then proceeded to arrange on the belt and upstream of each pair of buckles a means such as a permanent magnet that signals to the installation the imminence of the appearance of a pair of buckles. If the installation does not detect the passage of that pair of buckles within a certain amount of time, it is then possible to conclude that the two buckles of the belt are cut in that point of the conveyor. In that case, however, it is equally advisable immediately to stop the belt, with the consequence of a loss of profit arising from the (loss of the) time that is necessary for the repair.

As a matter of fact, when it has been established that one or both buckles of a pair have been cut, it is impossible to re-start the operation of the conveyor before the repair has taken place, since that cutting of the buckle will be detected automatically by the pair of the upstream pick-up devices, and that will again trigger a stoppage of the installation.

Of course, one solution would be to make the group of pick-up devices inoperative, but that cannot be allowed since, in this case, the conveyor would operate without any monitoring.

This invention has the aim, in particular, to eliminate those disadvantages and is concerned, to that end, with an installation for the monitoring of an endless conveyor belt, said installation comprising fixed monitoring stations that are distributed along the conveyor, while each monitoring station is combined with, at least, one detector assembly for the detection of the passage of pairs of closed conductive buckles which are called control buckles and which are distributed on the belt, in such a way that the buckles of the pairs of buckles are arranged cross-wise on the belt, said installation being characterized by the fact that the aggregate of the monitoring stations is connected with a central station, and by the fact that the endless belt comprises a reference aggregate that consists of several pairs of closed conductive buckles which are arranged close to one another on the belt lengthwise, for the numbering of the control buckles at the central station, while each monitoring station comprises a memory and a coding assembly for the generation of a signal that comprises, in coded form, the reference number of the monitoring station in question and information on the condition of the buckles of the detected pair of buckles, whereas the central station comprises a central unit that consists of a programmable memory for the emission, at regular intervals, of a coded signal for scanning the monitoring stations and for receiving, by way of response, successively, the coded signal of the aggregate of monitoring stations, a central control block in combination with the central unit and consisting of an active memory for receiving, at the time when the operation of the installation is started, the informations that relate to the numbering of the control buckles of the belt and the numbering of the monitoring stations along the conveyor, means connected with the central unit for ordering the conveyor to stop, means of visualization comparing the informations of the central control block with the informations received at the central unit, so as to show the number of the pair of control buckles in which a defect of one of the buckles has been detected and/or to show the number of the monitoring station by which the defect has been established, means of manual control at the control block for rendering void, in that control block, the number of the station and/or of the pair of control buckles the defect of which has been visualized, and for authorizing the continuation of the operation of the conveyor.

In accordance with another characteristic of the invention, for the detection of the defect of the two buckles of one and the same pair of control buckles, the control block unit receives, at the time when the operation of the installation is started, information on the number of scannings performed, at regular intervals, in regard to each monitoring station, between the detections of the pairs of control buckles and in regard to the programmed counters contained in the central station and which total the number of scannings carried out in regard to each monitoring station between the coded signals received successively by the central unit, said total numbers being compared to the corresponding numbers received by the central control block, so as to order, in the case of any disagreement, the means for stopping the conveyor and the means of visualization, in order to indicate the number of the monitoring station that has not detected any passage of the pair of buckles.

In accordance with another characteristic of the invention, the central station comprises a clock that determines the regular intervals during the emission of the scanning signals by the central unit.

Figure 2:
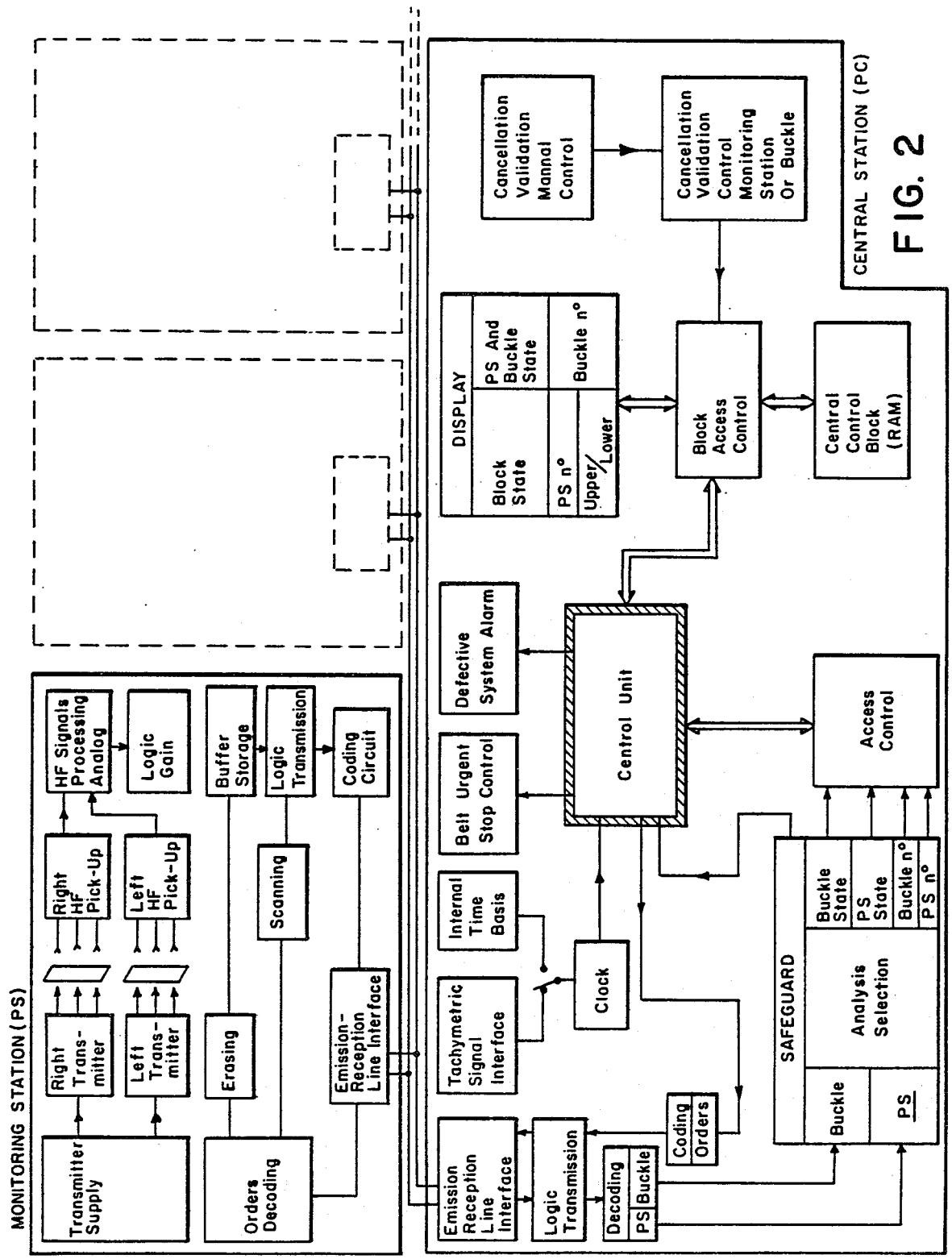

The invention is shown by way of non-limiting example by the inclosed drawings in which FIG. 1 shows, in schematic perspective, the total installation in accordance with the invention;

FIG. 2 shows, in the form of a synoptical diagram, one of the monitoring stations and the central station of FIG. 1.

Consequently, it is the objective of this invention to create an installation that monitors the state of a conveyor belt and makes it possible to detect the presence of tears on the endless belt, while that detection does not, however, entail a compulsory stop of the conveyor, but rather allows its operation to continue; in this case, the conveyor is still being monitored, except by the pair of defective buckles the failure of which has been established and which is held back.

In that way, it is possible to postpone the repair of the belt, in order to carry out that repair at a more opportune moment, during which it can be performed at the same time as the repair of several other defective buckles.

The present invention also has the objective of making the detection of cuts of two buckles of one and the same pair possible, without the requirement of any supplementary means of control on the belt itself.

Another objective of the invention lies in the fact that it makes it possible to prevent any errors in detection in regard to the buckles, due to a vertical or lateral displacement of the endless belt on the supports of the conveyor.

As shown in FIG. 1, the endless belt T has been provided with several pairs of buckles, B1, B2 . . . Bn, that are inserted in the belt and distributed in any desired manner over its length (e.g., every 1,000 m), while the buckles of each pair are mounted cross-wise on the belt.

Along that endless belt, there are likewise distributed, in any desired manner, some of the monitoring stations PS 1, PS 2 . . . PS n, which are connected in parallel on a telephone line that leads to a central station PC.

Each monitoring station PS is connected with detectors every one of which is made up of pairs of transmitter-pickup couples E1-C1; E2-C2 every one of which is arranged on the path of one buckle of the buckle pairs, so as to generate a detection signal when a uncut buckle passes opposite of one of those couples.

Every one of the monitoring stations that are placed along the conveyor, is connected, by preference, with two pairs of transmitters-pick-ups, while one of those pairs is arranged next to the upper leaf of the belt and the other pair is arranged next to the lower leaf of the belt, so that it is possible to double the monitoring capability of each monitoring station.

At one point of the endless belt T, there have also been placed, arranged in groups, several pairs of closed conductive buckles (e.g. three pairs R1, R2, R3, at a distance of 50 m from one another), which have been designed to serve as references to make the numbering of the buckles B1, B2, etc. possible which pass successively in front of each monitoring station.

The means for driving the endless belt of the conveyor are also connected with a tachymetric dynamo which is designed to generate a degree of tension that is proportionate to the speed of motion of the endless belt. The operations based on that tension will be explained later on.

At the central station, display means have been provided which make it possible to visualize either the number of the defective station or the number of the pair of defective buckles, with an indication of the upper leaf or of the lower leaf on which that defect has been established.

In addition, this central station comprises a manual control that makes it possible to cancel or to validate the check realized by a pair of buckles B1, B2, etc. of the endless belt.

In the case of the example shown in FIG. 1, it is established, accordingly, that the monitoring station bearing the number 10 is defective, and that one of the buckles of the pair of buckles #18 and 36 found on the lower leaf or on the upper leaf, has been cut.

Moreover, this central station indicates, by means of the code wheel for the cancellation-validation order, that the pair of buckles #36 is about to be held back.

This central station is also connected with means that will make it possible to stop the operation of the conveyor, and with means of visualization that will indicate the existence of a defect at a monitoring station or at the central station.

The operation of this installation is as follows:

The detection of the passage of the buckles is ensured by the monitoring stations PS which are distributed along the conveyor. These monitoring stations are interrogated, by turns, by the central station PC to which they supply the informations that relate to the state of the buckles at the moment of their passage in front of each monitoring station.

The frequency of those scannings of the monitoring stations is determined by a clock the power of which is supplied either by an internal time base or derived from the tachymetric dynamo D through an interface. The internal time base will be put into operation when the belt has a constant moving speed, whereas the clock will be driven by the signal generated by the tachymetric dynamo when the belt can be driven at variable speed.

At each passage of buckles in good condition, the pick-ups C1, C2 will transmit an HF signal to an analog circuit for processing those HF signals.

The analog circuit for the processing of the HF signals brings about, first of all, in a retarding-comparative stage, a differentiation between the HF radiation caused by a buckle at the moment of its passing in front of a pick-up, and a certain permanent radiation between the transmitter and the pick-up, and the purpose of that is to ensure a protection from any outside interferences.

That retarding-comparative stage has been established also in order to prevent the generation of any incorrect signals that might result from a modification of the distance of the control buckles from the pick-ups, due to a local lifting of the endless belt in relation to its supporting pulleys.

To that end, the signal that comes from each pick-up, is first of all filtered, amplified, and transformed into a direct-current voltage that is proportionate to the field received by the pick-up. That direct-current voltage will then be led, on the one hand, directly to one of the inputs of a comparator, and on the other hand, to the second input of that comparator by way of a retarding device that has a sufficiently large time constant to follow the slow variations of the level of the endless belt.

The comparison of those two voltages will then make it possible to detect the passage of a buckle which causes a rapid increase in the voltage, while it prevents any confusion with the variations of the magnetic field that may result from a vertical movement of the belt. The signal of the detection of the passage of a buckle, transformed into logic information, will then be supplied to the logic gain circuit in order to be normalized before it is stored in a buffer storage unit. The buffer storage unit retains the informations until the scanning signal that emanates from the central station, issues an order of transfer to a logic transmission circuit, that is responsible for the normalization of the "state of buckles" signals before they are coded.

The frequency of those scannings (one scanning every 0.5 seconds, e.g.) is determined, as has already been indicated, by the clock, either on the basis of the internal time or by the tachymetric dynamo. The emission-reception line interface makes it possible to transmit coded informations on the telephone line in both directions, to and fro. The coded informations that originate in all the monitoring stations, are transmitted in series over only one telephone line to the central station. The input of the central station comprises, just as the monitoring stations, an emission-reception interface circuit that makes it possible to transmit coded informations over the telephone line in both directions.

The coded informations are applied first to a logic transmission circuit that is responsible for their normalization, before they are sent to the decoding circuit that makes it possible to have the informations relating to the "state of the buckle" and to the "state of the station" appear and to separate them.

Subsequently, the signals "state of the buckle" and "state of the station" will be applied to an analysis-selection circuit the objective of which is, first of all, to identify the signals of the monitoring station PS and the signal generated by the reference group consisting of the buckles R1, R2, and R3.

That analysis-selection circuit will then ensure, with the aid of programmable counters, the numbering of the buckles with regard to the buckles of the reference group, and it will supply the four basic informations that make the operation of the installation possible, and which relate to the state of the control buckles B1, B2, etc., to the state of the monitoring stations PS1, PS2, etc., to the number of those control buckles, and to the number of the monitoring posts. The four informations relating to the state of the buckle, the state of the station, and their respective number, are transmitted to the central unit UC through the access control which is responsible for the regulation of the input.

The central unit is essentially a programmable memory in which the program of the operation, which is ensured by a microcomputer, is recorded in a definitive manner. The program of the central unit is defined by a given installation, as function of the desired monitoring criteria. In particular: number of stations, number of buckles, minimum and maximum distances, number of scannings, alarm threshold, etc.

The central unit operates in combination with the central control block which is an active memory that contains the informations relating to the physical arrangement of the elements of the installation such as it is defined at the beginning of the operation, i.e. the numbering of the monitoring stations, regarding the place and the numbering of the buckles on the belt.

The informations that are contained in the central control block, may be modified at any time, even during the operation, with the aid of a manual "cancellation-validation" control. It is possible, therefore, to cancel any monitoring stations and/or buckles that are defective, and to continue the operation without any trouble, and to put them back into service at a later time when they have been put in order. It is also possible to add monitoring stations or buckles in addition to those that had been placed at the start, and to do so within the limits of the capacity of the memory as defined by the control unit, and under the condition that those additions will be within the scope of the program of the central station, as that program has been defined for the installation.

The operation of the central unit, as it results from the synoptic schematical drawing of FIG. 2 is as follows:

The central unit triggers permanently, at a frequency determined by the clock, the scanning orders of the group of monitoring stations PS.

Every monitoring station is interrogated in turn and responds to the address code assigned to it. When the monitoring station in question recognizes its address code, it issues a signal of recognition and provides the information that is contained in its memory and relates to the state of the last pair of control buckles that has passed within his monitoring area.

Those informations which are processed, digitized, coded, decoded, etc., are routed to the central unit. Following the reception of the message and the verification of the conformity and correctness of the information, the central unit orders that the memory of the monitoring post in question be freed so as to make it available for the passage of the following buckles.

The central unit which has at its disposal informations as to the "state of the buckle" and to its number and to the "state of the monitoring post" and its number, consults the control block first. Following the consultation of the control block, the behavior of the central unit is as follows:

(a) In regard to the state of the control buckles:

When the installation establishes the passage of the two buckles of one pair, that detection does not find its expression in any effect either on the control block or on the central unit.

When the installation establishes the passage of only one buckle, since the second one is cut in this case, that detection finds its expression in two possible responses of the central unit: either the cut buckle has already been cancelled out on the control board by means of a manual control device, and in this case, no action will take place on the central unit; or the buckle would have to exist and, in this case, the central unit will order the closing of a relay that will cause the belt to be halted, while the organs of visualization indicate the number of the monitoring station which has detected said cut of the buckle, lights the signal lamp specifying that said detection has taken place on the upper leaf or on the lower leaf of the belt, indicates the number of the torn buckle (said number being determined from the buckles of the reference group) and also lights a signal lamp indicating the failure of the buckle.

(b) in regard to the state of the monitoring stations:

When the information received is correct, that fact does not find its expression in any effect on the control board or on the central unit;

When the information is erroneous, two responses are possible, following consultation of the central control block:

When the monitoring station in question has been cancelled out on the central control block by means of actuation of the manual control device, there will be no effect on the central unit.

On the other hand, when that monitoring station should have to be in good condition, the central unit will order the closure of an alarm relay and cause the visualization of the number of the failing monitoring station, while signal lamps are lighted to show the failure of said monitoring station.

Beyond the processing of informations relating to the state of the control buckles and to the state of the monitoring stations, the central station also generates information in the case of the absence of the tachymetric signal which would prevent any scanning of the monitoring stations by the central station. In that case, the central unit will order the closing of a failure relay, and the conveyor belt will not be halted any more, except upon manual command. Likewise, in the absence of said tachymetric signal, the central station will cause the lighting of signal lamps indicating, on the one hand, the existance of a defect within the installation, and on the other hand, the lighting of the particular signal lamp indicating the failure of the tachymetric signal.

I claim:

1. An installation for monitoring the state of an endless conveyor belt driven by belt driving means, said installation comprising:
   a plurality of closed conductive control buckles transversely disposed on said belt and distributed at spaced-apart locations along the path of said belt;
   a plurality of fixed monitoring stations distributed at spaced-apart locations along the path of said belt and each of said monitoring stations being coupled with at least a detector assembly having at least a transmitter and a corresponding pick-up for detecting the passsage of said control buckles at each said monitoring station;
   a central station to which each said monitoring station is connected for transmitting signals comprising information pertaining to the state of said control buckles and pertaining to the state of each said monitoring station, said central station comprising:
   a central unit for receiving said signals;
   programmed counters for counting the total numbers of impulses received between pairs of successive signals corresponding to successive control buckles and received by said central unit from each of said monitoring stations, and for comparing said total numbers to reference total numbers so as to deliver, in case of any discrepancy, signals corresponding to defective control buckles;
   belt stop control means connected with said said central unit and for ordering said conveyor belt to stop when said central unit has received signals corresponding to defective buckles or monitoring stations;
   display means connected with said central unit and for indicating the state of said control buckles and monitoring stations;
   manual control means for inhibiting, when actuated, at least a signal corresponding to a defective control buckle or monitoring station;
   automatic means for authorizing the continuation of the operation of said belt when said central unit receives signals corresponding to defective control buckles or monitoring stations after inhibition of said signals by said manual control means;
and wherein:
   said control buckles are arranged in spaced apart pairs of control buckles, with the control buckles of each pair are being mounted cross-wise on said belt;
   each said detector assembly having a pair of transmitter and pick-up couples, each said transmitter and pick-up couple being arranged on the path of one control buckles of each said pair of control buckles, so as to generate a detection signal when an uncut control buckle passes opposite one of said pair of transmitter and pick-up couples;
   said installation further comprising a plurality of pairs of closed conductive reference buckles, which are mounted at close spaced-apart locations lengthwise on a portion of said belt and the buckles of each said pair of reference buckles being mounted crosswise on said belt portion, for giving a reference number to each said monitoring station and to each pair of said control buckles passing successively opposite each said detector assembly coupled to each monitoring station;
   each said monitoring station comprising a buffer memory for storing information on the state of the buckles of a detected pair of control buckles, and a coding circuit for generating said coded detection signals, in coded form, each of said coded detection signals comprising said reference number of the corresponding monitoring station and said information on the state of the corresponding detected pair of control buckles;
   all monitoring stations being connected to said central station by a single common conventional telephone line;
   said central unit of said central station comprising a programmable memory emitting at regular intervals coded scanning signals for scanning successively, through said telephone line, said monitoring stations and receiving successively in response, through said telephone line, said coded detection signals from said monitoring stations, the buffer memory of each of which is emptied in response to the first coded scanning signal received after storage of information corresponding to the state of a detected pair of control buckles;
   said central station further comprising a central control block connected to said central unit and comprising an active memory for storing, at the starting of said installation, information relating to said reference numbers of said pairs of control buckles and said monitoring stations and information relating to said reference total numbers which correspond to the total numbers of coded scanning signals transmitted to each of said monitoring stations between two successive coded detection signals corresponding to two successive pairs of control buckles and received by said central unit from the corresponding monitoring station;
   said informations corresponding to said reference numbers and stored in said active memory being compared in said central station to said informations comprised in said coded detection signals received by said central unit so that said display means, which is common to all said pairs of control buckles and to all said monitoring stations, indicates in succession the reference numbers and states of said pairs of control buckles and in succession the reference numbers and states of said monitoring stations;
   said information corresponding to said reference total numbers and stored in said active memory being compared to said total numbers of impulses, each of which corresponding to a coded scanning signal, and which are counted in said counters between the reception of two successive coded detection signals corresponding to two successive detected pairs of control buckles, so that said display means indicates, in case of any discrepancy, the number of the monitoring station that has not detected any passage of a pair of control buckles, the two buckles of which being defective; and said central control block is connected to said manual control means for inhibiting any comparison of information comprised in a coded detection signal and corresponding to a reference number of a pair of control buckles or of a monitoring station the state of which has been displayed as defective, when said manual control means are actuated.

2. An installation according to claim 1, wherein each said monitoring station is coupled to two detector assemblies one of which having its pair of transmitter and pick-up couples mounted adjacent the upper leaf of said endless conveyor belt and the other detector assembly having its pair of transmitter and pick-up couples mounted adjacent the lower leaf of said belt, and wherein said display means gives an indication of the upper or lower leaf of said belt on which a detection has been established.

3. An installation according to claim 1, wherein said central station further comprises a clock for determining said regular intervals of emission of said scanning signals and an internal time basis connected to said clock for generating scanning signals when said belt has a constant moving speed.

4. An installation according to claim 1, wherein said central station further comprises a clock for determining said regular intervals of emission of said scanning signals, said clock being connected to a tachymetric dynamo driven by said belt driving means for generating scanning signals the frequency of which being proportional to the belt speed.

5. An installation according to claim 1, wherein each of said monitoring stations comprises an analog circuit for processing the signals issued from said pick-up couples and having a retarding-comparative stage for differentiating the permanent signals between said pick-ups couples and the corresponding transmitters from the signals caused by the passage of said control buckles on front of said pick-up couples.

* * * * *